J. E. BOWMAN.
ACCELERATOR FOR AUTOMOBILES.
APPLICATION FILED JUNE 23, 1914.

1,132,907.

Patented Mar. 23, 1915.

WITNESSES:
P. F. Brewer,
B. D. Wallace.

INVENTOR.
John E. Bowman.
BY Harry D. Wallace
ATTORNEY.

UNITED STATES PATENT OFFICE.

JOHN E. BOWMAN, OF SYRACUSE, NEW YORK.

ACCELERATOR FOR AUTOMOBILES.

1,132,907.  Specification of Letters Patent.  Patented Mar. 23, 1915.

Application filed June 23, 1914. Serial No. 846,765.

*To all whom it may concern:*

Be it known that I, JOHN E. BOWMAN, a citizen of the United States, residing at Syracuse, in the county of Onondaga and State of New York, have invented certain new and useful Improvements in Accelerators for Automobiles, of which the following is a specification.

This invention relates to improvements in accelerators for automobiles, and the invention relates particularly to an auxiliary mechanism to be operated by the operator's foot.

The object of the invention is to provide a novel, simple and effective foot-accelerator for controlling the throttle of automobile engines, the said mechanism arranged to coöperate with the hand-controlled throttling mechanism. And a further object is to generally improve, simplify and cheapen mechanisms of the class. I attain these objects by the means described hereinafter, illustrated by the accompanying drawing, and then pointed out by the appended claim.

Figure 1:
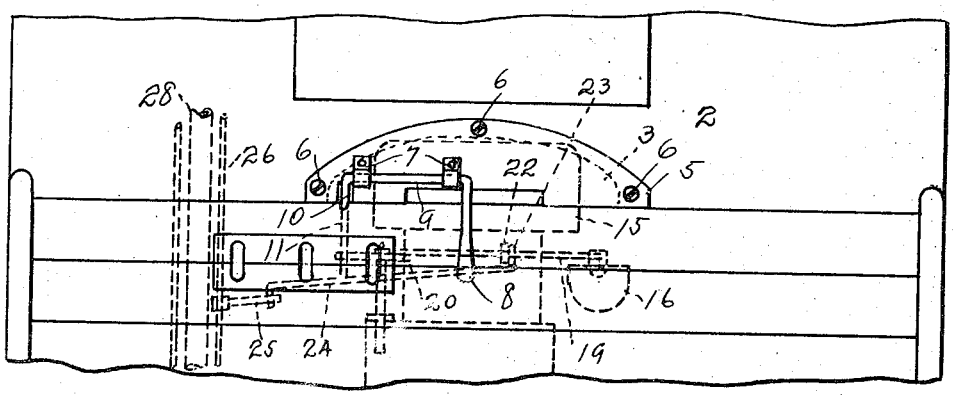
Figure 2:
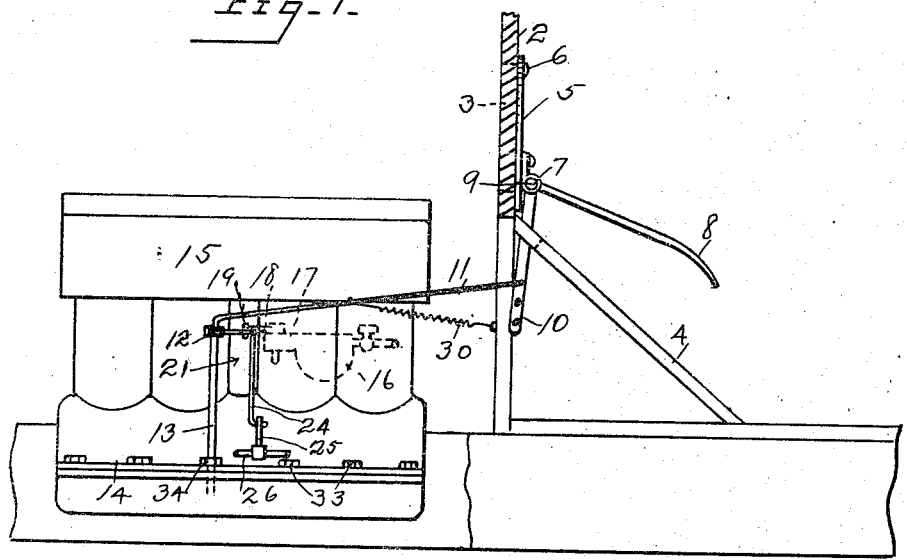
Figure 3:
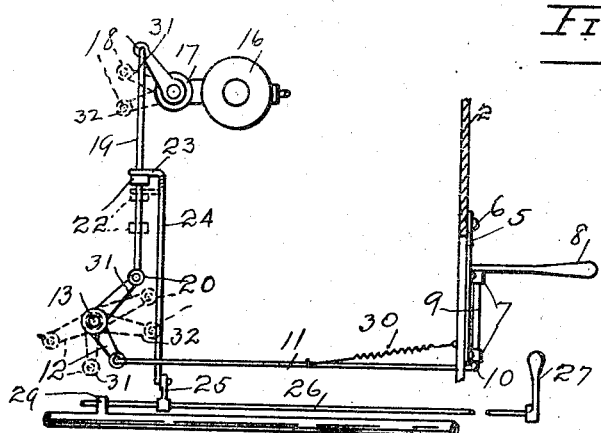
Figure 4:
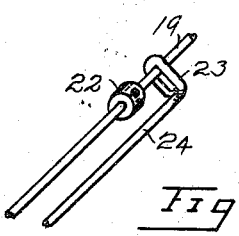

Figure 1 is a view of the rear side of the dash of an automobile which supports certain parts of the invention. Fig. 2 is a vertical longitudinal section through the same. Fig. 3 is a top plan view of the accelerating mechanism. Fig. 4 is a detail perspective view of the transverse rod in connection with a part of the hand-controlled mechanism.

In the drawing, 2 represents the dash of an automobile which has a central opening 3, (see dotted lines Fig. 1.)

4 represents the inclining removable floor or bottom of the car disposed immediately rearwardly of the dash.

The opening 3 is closed by a metal plate 5, secured by screws 6, to which the pedal of my foot-accelerator is pivotally attached by lugs or bearings 7. The pedal consists of an arm 8 which overhangs the floor 4, and is integral with one end of a horizontal shaft-portion 9, which is journaled in the bearings 7. From the other end of shaft 9 depends an arm 10 the lower end of which is perforated to receive one end of a forwardly extending rod 11, the said perforations being provided for varying the leverage or throw of the said rod when the pedal is depressed. The forward end of the rod 11 connects with an arm 12 of a bell-crank which is pivoted to the top of a post or stud 13, the lower end of said post being threaded into the flange 14 of the base of the engine 15.

16 represents the carbureter, which is located at the opposite side of the engine from the post 13, and 17 represents the throttle which is controlled by a lever 18.

19 represents a transverse rod the opposite ends of which connect respectively with the lever 18 and an arm 20 of the bell-crank, the said rod passing through an opening 21 arranged between the middle cylinders of the engine. The rod 19 carries a rigid stop 22 disposed intermediate its ends, which is engaged by the looped-end 23 of a rod 24 comprising a part of the usual hand-control for the throttle. The opposite end of rod 24 connects with a crank-lug 25 carried by a rod 26, one end of said rod having a handle 27, which is disposed near the upper end of the steering column 28, generally directly beneath the steering wheel (not shown). The rod 26 parallels the column 28, and is journaled in a lug 29, carried by said column.

30 represents a spring, one end of which connects with the rod 11, while the other end thereof connects with the front-side of the dash 2. The spring 30 normally exerts its tension for holding the throttle closed, as shown by the full lines in Fig. 3.

The operation of my accelerator is as follows: To start the engine the operator manipulates the handle 27 for opening the throttle part-way (see dotted line positions 31 in Fig. 3). By the turning of handle 27 as described the throttle lever 18 is moved toward the open position sufficiently to allow a certain normal feed of the carbureter. The hand lever 27 is then left in said operated position. Thereafter, whenever it is desired or necessary to open the throttle to a greater extent, the operator utilizes the pedal 8, which he may depress for moving the bell-crank, rod 19 and lever 18, to the further open position, as shown by the dotted lines 32 in Fig. 3. During the running of the car the pedal 8 is to be used for varying the throttle between the extremes indicated by the said dotted positions 31 and 32, thus leaving the operator's hands free for manipulating the other controlling parts. Finally, to close the throttle entirely, the hand-lever 27 is operated in the reverse direction and the foot is removed from the pedal, for allowing the spring 30 to close the throttle entirely, as well as to restore all of the accelerator parts to the full line position shown in Fig. 3.

The adaptation of my improvement to the well-known Ford and similar automobiles is very readily and cheaply accomplished. The plate 5 takes the place of a similar plate carried by all such cars, and enables me to install the accelerator to the rigid dash, instead of the removable floor, as 4, where it would have to be frequently disconnected, removed and replaced, for allowing access to the mid-interior of the car. And furthermore the provision of the post 13, also saves time and labor, as the said post replaces one of the bolts, as 33, which are usually employed for anchoring the engine to the chassis. The said post when screwed into the shoulder 34 answers the purpose of the displaced bolt and also affords a strong, firm and convenient support for the bell-crank and related parts.

Having thus described my invention, what I claim as new, and desire to secure by Letters Patent, is—

An accelerator, in combination with a throttle valve, including a bell-crank, a rod connecting one arm of said bell-crank directly to the throttle valve, said rod having a stop intermediate to its ends, a hand-throttle mechanism including a rod having a loop slidable on said first rod, said loop engaging said stop for opening said valve, means for manually operating said second rod, and a pedal operatively connected to the other arm of said bell-crank for operating said first rod independently of said loop.

In testimony whereof I affix my signature in presence of two witnesses.

JOHN E. BOWMAN.

Witnesses:
HARRY DE WALLACE,
E. C. WRIGHT.